N. KRUPA.
POTATO GATHERER.
APPLICATION FILED APR. 15, 1921.
1,411,361.
Patented Apr. 4, 1922.
3 SHEETS—SHEET 3.
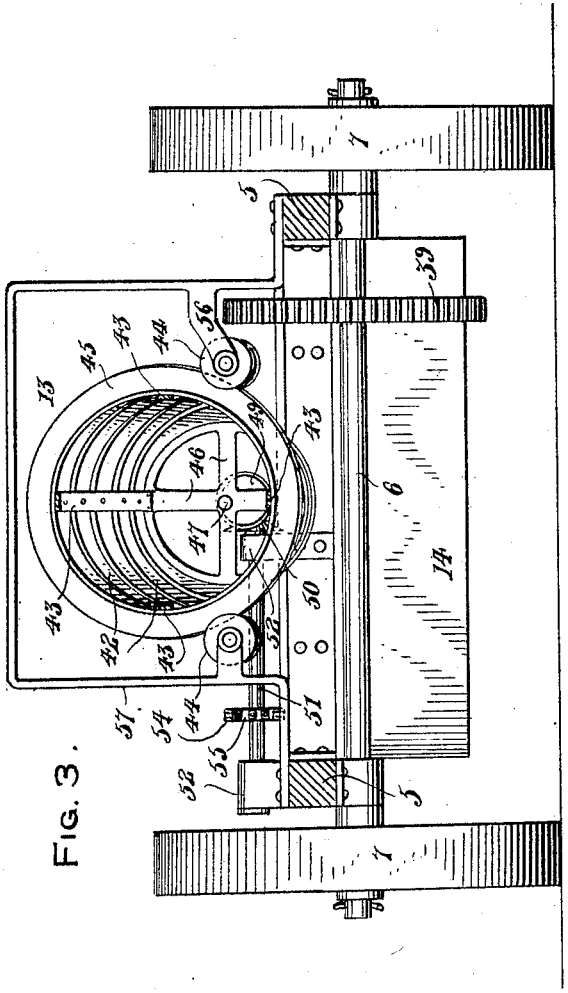
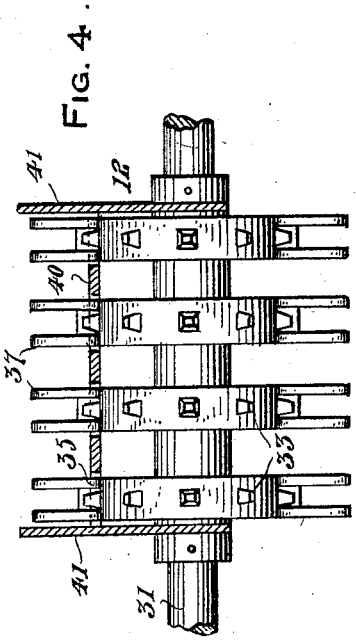
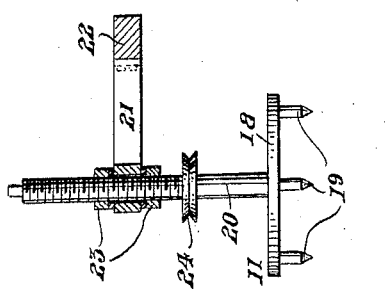
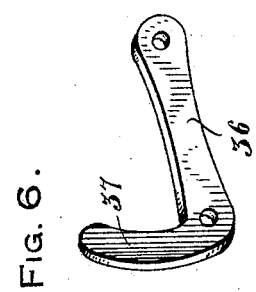
Inventor
N. Krupa
By F. H. L. Bryant.
Attorney

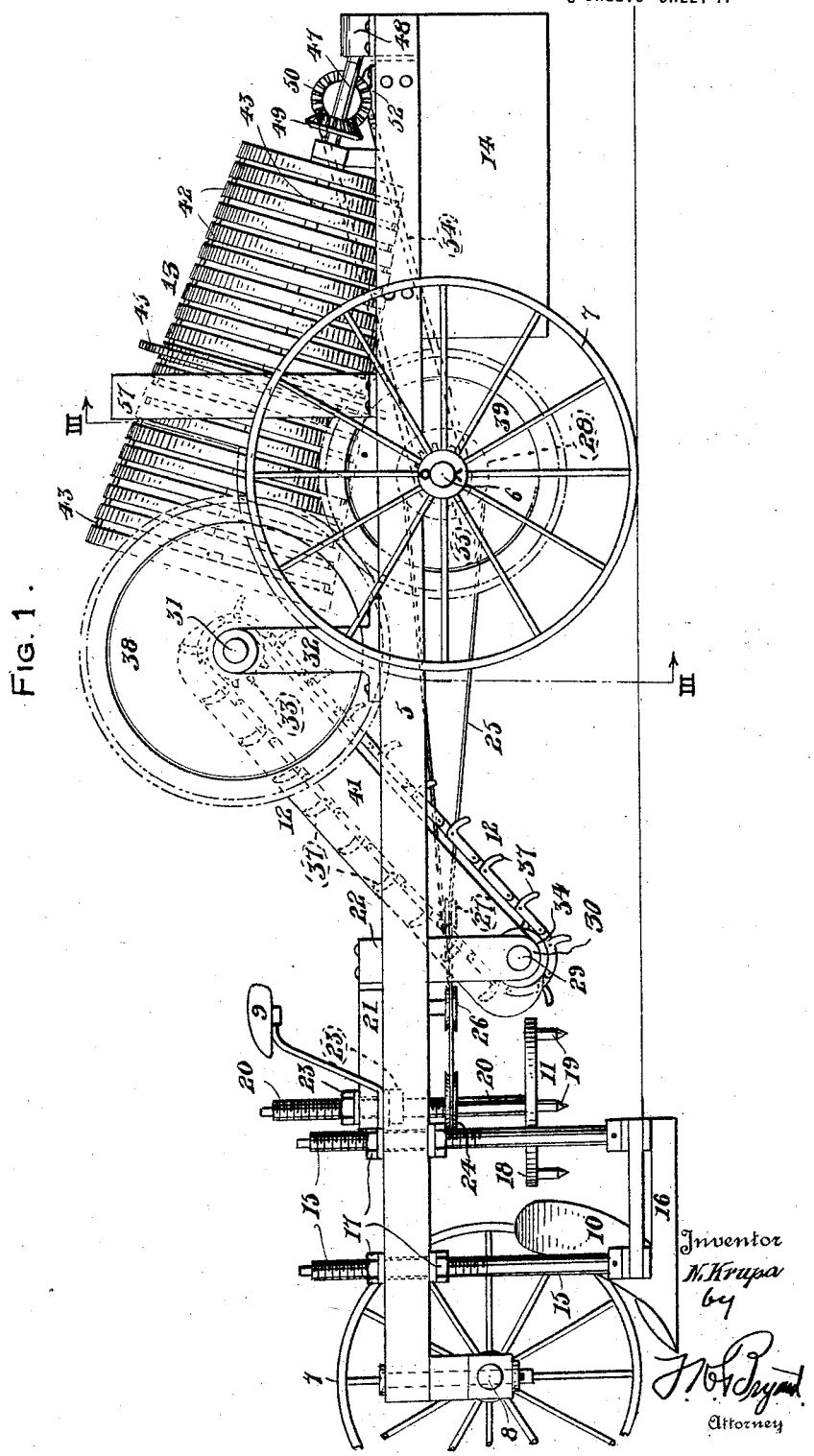

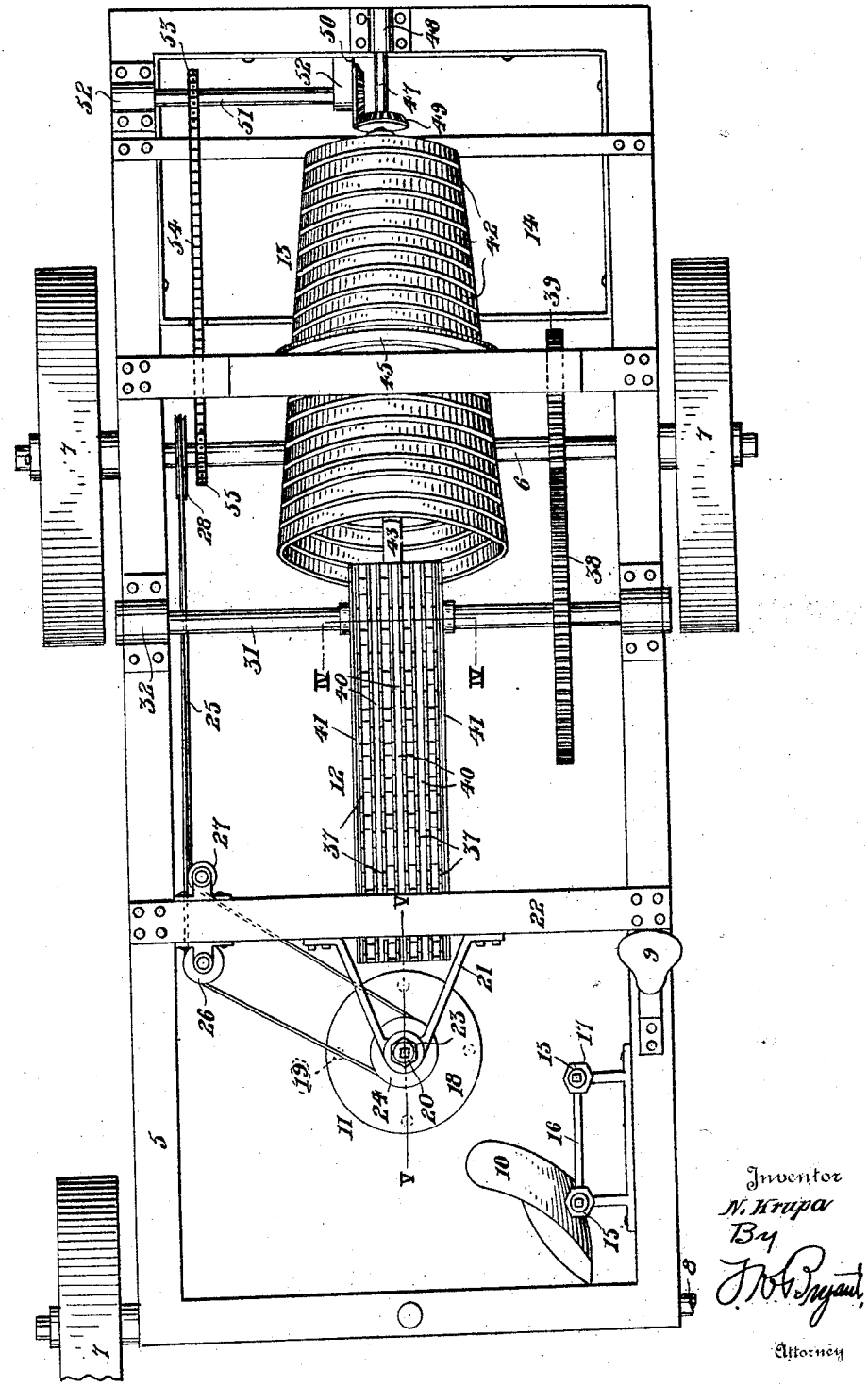

UNITED STATES PATENT OFFICE.

NIKOLAS KRUPA, OF READING, PENNSYLVANIA.

POTATO GATHERER.

1,411,361. Specification of Letters Patent. Patented Apr. 4, 1922.

Application filed April 15, 1921. Serial No. 461,532.

*To all whom it may concern:*

Be it known that I, NIKOLAS KRUPA, a citizen of Ukraine, residing at Reading, in the county of Berks and State of Pennsylvania, have invented certain new and useful Improvements in Potato Gatherers, of which the following is a specification.

This invention relates to certain new and useful improvements in potato gatherers of that type embodying an earth working element or tool designed to turn over the soil for permitting the potatoes to be conveyed and separated from dirt and then deposited into a suitable collection receptacle mounted on the vehicle.

The primary object of the invention is to generally improve and simplify devices of this character whereby the same will be extremely efficient in operation as well as durable and easily attended to by a single operator.

A further object of the invention is to provide improved means for breaking up the soil as the same is plowed whereby the potatoes are loosened from the soil forwardly of an elevating conveyor so that said conveyor may readily take up the potatoes and convey them to a sifting device.

Other objects will appear as the nature of the invention is better understood and the same consists in the novel form, combination and arrangement of parts hereinafter more fully described and shown in the accompanying drawings, in which like reference characters indicate corresponding parts throughout the several views.

In the drawings,

Figure 1 is a side elevational view of a potato gatherer constructed in accordance with the present invention, partly broken away, Figure 2 is a top plan view thereof, Figure 3 is a vertical sectional view taken upon line III—III of Fig. 1, Figure 4 is a fragmentary vertical sectional view of the conveyor taken upon line IV—IV of Figure 2, Figure 5 is a longitudinal vertical sectional view taken upon line V—V of Fig. 2, and showing the earth breaking element and Figure 6 is a perspective view of one of the links and potato engaging arms of the conveyor.

Referring more in detail to the several views, the invention embodies a substantially rectangular vehicle frame 5 having a rear axle 6 with suitable supporting wheels 7 fixed thereon and provided with a front steering axle 8 also provided with supporting wheels 7. It is to be understood that the vehicle may be either drawn by horses or propelled through the medium of a motor, not shown, and any desired steering mechanism may be employed if the device be motor driven. A seat 9 for the operator is preferably supported upon one of the side rails of the frame 5 adjacent the forward end of the latter.

Generally speaking, the invention combines in cooperative relation and supported by the frame of the vehicle, a forward plow 10 arranged to turn the furrow toward the center of the vehicle in front of an earth working element 11 designed to break up the soil so as to free the potatoes in advance of an elevating conveyor 12 which has its discharge end arranged to deliver the potatoes and what soil adheres thereto into the adjacent open end of a revolving screen 13 whereby the dirt is sifted through the screen onto the ground and the clean potatoes are then discharged into a suitable collecting receptacle 14 which is carried by the frame rearwardly of the rear axle 6 and beneath the rear end of the screen 13.

The plow 10 is of ordinary construction embodying a mold board for insuring turning over of the soil and mounted upon the lower ends of a pair of upright posts 15 which slidably project through a suitable bracket 16 rigidly fastened to the adjacent side rail of the frame 5, the upper ends of the posts 15 being threaded and receiving nuts 17 at opposite sides of the brackets 16 whereby the plow may be adjusted and held adjusted for digging a furrow of the required depth.

The earth breaking element 11 is disposed substantially in the longitudinal axis of the frame 5 slightly rearwardly of the plow 10 and embodies a horizontal disk 18 with depending teeth or spurs 19 and centrally attached to a vertical shaft 20 which is journaled in a suitable bracket 21 rigidly carried by a cross bar 22 which is fixed to the side rails of the frame 5 rearwardly of the seat 9. The upper end of the shaft 20 is threaded and has a pair of nuts 23 threaded thereon so as to engage opposite faces of the bracket 21 whereby the earth breaking element may be adjusted to any desired height from the ground according to various conditions met in the operation of the gatherer and maintained so adjusted while permitting free rotation of the same. A pulley 24 is rigidly fastened upon the vertical shaft 20 and an endless belt 25 passes around the pulley 24 and laterally to the side of the frame 5 which is opposite the plow 10 where it passes around a pair of guide pulleys 26 and 27 and then rearwardly to and around another pulley 28 which is rigidly fastened upon the rear axle 6 whereby upon forward movement of the vehicle, the rotation of the rear ground wheels 7 is communicated to the earth breaking element 11 for rotating it and causing the spikes 19 to break up the dirt for freeing the potatoes therefrom.

The conveyor 12 comprises a foot shaft 29 arranged transversely of the vehicle and suitably supported in a horizontal position for free rotation by depending brackets 30 rigidly fastened to the transverse bar 22, and a head shaft 31 journaled in the upper ends of the upright brackets 32 which are mounted upon the side rails of the frame 5 rearwardly of the bar 22, suitable sprocket wheels 33 being fastened upon the head shaft 31 in slightly spaced relation as clearly shown in Figure 4, and similar sprocket wheels 34 being fastened upon the foot shaft 29. Each sprocket wheel 34 is alined with one of the sprocket wheels 33 and an endless chain 35 passes around each alined pair of sprockets 33 and 34, which chains are composed of a plurality of lengths arranged in pairs and constructed as shown in Figure 6 which links include the usual plate portions 36 with upwardly extending arms or fingers 37 arranged to engage the potatoes as they are freed from the earth and transfer the same to the revolving screen 13. Rotation is imparted to the head shaft 31 by means of a large spur gear 38 fastened upon the shaft 31 and meshing with another smaller spur gear 39 suitably fastened upon the rear axle 6. The endess conveyor 12 also embodies a plurality of plates 40 closing the spaces between the chains and suitably supported from the shafts 29 and 31 whereby dropping of the potatoes from the fingers 37 is prevented. Also, the shafts 29 and 31 support side guide plates 41 which also confine the potatoes upon the conveyor.

The revolving screen or sifter 13 preferably comprises a tapered cylinder formed of a plurality of spaced hoops 42 which are suitably rigidly connected by longitudinal strips 43, and the cylinder is supported with its larger inlet end adjacent the discharge end of the conveyor 12 and at a rearward inclination by means of a pair of rollers 44 positioned at opposite sides of said cylinder and grooved for reception of the annular track 445 which is rigidly fastened upon the exterior of said cylinder, the cylinder being also provided with a spider 46 at each end in which a longitudinal shaft 47 is centrally fixed and which has its rear end suitably retained and journaled in a bearing bracket 48 mounted upon the rear end of the frame 5. The projecting rear end of the shaft 47 is provided with a bevel gear 49 which matches with another bevel gear 50 carried upon the adjacent end of a transverse shaft 51 which is journaled for rotation in bearing brackets 52 carried by the frame of the vehicle adjacent the rear end of the latter. A sprocket wheel 53 is also fastened upon the shaft 51 and a chain 54 passes around the same and also forwardly and around another sprocket wheel 55 which is fastened upon the rear axle 6. It will thus be seen that rotation of the rear supporting wheels 7 and axle 6 is communicated to the screen or sifting drum 13 whereby the potatoes are freed of fine particles of dirt which pass between the hoops 42, as said potatoes are gradually fed rearwardly. The discharge end of the sifting drum is disposed above the open top of the receptacle 14 so that the potatoes are delivered to the latter as they are screened. The supporting rollers 44 for the sifting cylinder 13 are preferably journaled in suitable inwardly projecting brackets 56 carried by a relatively large inverted substantially U-shaped frame 57 whose ends are outturned and rigidly secured to the side rails of the vehicle frame 5 and which spans the sifting cylinder as clearly shown in Figures 2 and 3. By adjusting the plow 10 upwardly, the earth breaking element 11 and conveyor 12 will be brought closer to the ground than has been shown in Figure 1 whereby the parts will be properly disposed for permitting the conveyor to engage and elevate the potatoes to the sifting drum.

In operation, forward movement of the vehicle is obtained in any desired way causing rotation of the earth breaking element 11 and as the latter revolves, the spikes 19 break up the dirt for freeing the potatoes. Upon continued forward movement of the vehicle the potatoes and dirt are elevated by the conveyor 12 and delivered to the sifting drum 13 which separates the potatoes from the dirt by permitting the passage of the latter between the hoops 42 and the potatoes are then fed by gravity into the collecting receptacle 14.

It will thus be seen that the present invention provides an extremely efficient means for the gathering of potatoes and which may be readily manipulated and controlled by a single operator with efficient results.

Minor changes may be made in form, combination and arrangement of parts of the invention without departing from the spirit and scope of the same as claimed.

What is claimed as new is:

1. A potato gatherer including a wheeled supporting frame, a furrow turning plow supported by said frame for vertical adjustment adjacent one side of the latter whereby the furrow is turned toward the center of the frame, a rotary earth breaking element supported at the center of the frame slightly rearwardly of said plow, means arranged to elevate the potatoes and dirt after the earth has been broken by said element, and a sifting device for separating the dirt from the potatoes arranged to receive said dirt and potatoes from the discharge end of the elevating means.

2. A potato gatherer including a wheeled supporting frame, a furrow turning plow supported by said frame for vertical adjustment adjacent one side of the latter whereby the furrow is turned toward the center of the frame, a rotary earth breaking element supported at the center of the frame slightly rearwardly of said plow, means arranged to elevate the potatoes and dirt after the earth has been broken by said element, a sifting device for separating the dirt from the potatoes arranged to receive said dirt and potatoes from the discharge end of the elevating means, said earth breaking element and said sifting device including rotatable members, said wheeled supporting frame comprising a rotatable rear axle with ground wheels fixed thereon and means operatively connecting the earth breaking element, the sifting device and elevating means with said rear axle.

3. In a potato gatherer, wherein means are provided for turning a furrow in advance of an elevating conveyor, means for breaking up the earth of the furrow in advance of said elevator comprising a vertical shaft, a horizontal disk fixed upon the lower end of said shaft and provided with depending teeth, and means to rotate said shaft.

4. A potato gatherer including a wheeled supporting frame, a furrow turning plow supported by said frame for vertical adjustment adjacent one side of the latter whereby the furrow is turned toward the center of the frame, a rotary earth breaking element supported at the center of the frame slightly rearwardly of said plow, means arranged to elevate the potatoes and dirt after the earth has been broken by said element, a sifting device for separating the dirt from the potatoes arranged to receive said dirt and potatoes from the discharge end of the elevating means, means to vertically adjust said plow, and means to vertically adjust said earth breaking element.

5. In a potato gatherer, wherein means are provided for turning a furrow in advance of an elevating conveyor, means for breaking up the earth of the furrow in advance of said elevator comprising a vertical shaft, a horizontal disk fixed upon the lower end of said shaft and provided with depending teeth, means to rotate said shaft, a bracket having the upper end of said vertical shaft journaled therein, said upper end of the vertical shaft being threaded, and nuts threaded upon the shaft at opposite sides of said bracket whereby the disk may be adjusted a desired distance from the ground and maintained so adjusted.

In testimony whereof I affix my signature in presence of two witnesses.

NIKOLAS KRUPA.

Witnesses:
Thomas A. Cody,
P. A. Breen.